United States Patent [19]

Newaz et al.

[11] Patent Number: 5,765,600
[45] Date of Patent: Jun. 16, 1998

[54] PIPE DESIGNS USING COMPOSITE MATERIALS

[75] Inventors: Golam M. Newaz, Granville; Michael J. Cassady, Mount Vernon; Edward S. Lipinsky, Worthington; Gary R. Hattery, Columbus, all of Ohio

[73] Assignee: Gas Research Institute, Chicago, Ill.

[21] Appl. No.: 717,534

[22] Filed: Sep. 20, 1996

Related U.S. Application Data

[63] Continuation of Ser. No. 297,366, Aug. 29, 1994, abandoned.
[51] Int. Cl.[6] .................................................. F16L 9/14
[52] U.S. Cl. ........................... 138/141; 138/99; 138/125
[58] Field of Search ............................. 138/104, 140, 138/125, 99, 141, 174, 124

[56] References Cited

U.S. PATENT DOCUMENTS

| | | | |
|---|---|---|---|
| 2,703,774 | 3/1955 | Morrison | 138/DIG. 7 |
| 3,205,913 | 9/1965 | Ehlers | 138/125 |
| 3,918,499 | 11/1975 | Higbee | 138/125 |
| 3,957,085 | 5/1976 | Ball | 138/137 |
| 4,104,095 | 8/1978 | Shaw | 138/125 |
| 4,207,364 | 6/1980 | Nyberg | 138/140 |
| 4,800,109 | 1/1989 | Washizu | 138/141 |
| 4,915,139 | 4/1990 | Landry et al. | 138/174 |
| 5,302,428 | 4/1994 | Steele et al. | 138/174 |
| 5,482,087 | 1/1996 | Overbergh et al. | 138/99 |
| 5,551,484 | 9/1996 | Charboneau | 138/104 |
| 5,660,660 | 8/1997 | Greuel, Jr. et al. | 138/99 |
| 5,662,974 | 9/1997 | Andrenacci et al. | 138/141 |

*Primary Examiner*—David Scherbel
*Assistant Examiner*—James F. Hook
*Attorney, Agent, or Firm*—Dick and Harris

[57] ABSTRACT

Methods for producing improved pipe structures for natural gas distribution pipelines produce a thin fibrous jacket or layer which can inhibit and prevent cracks in natural gas distribution piping by preventing surface scratches as well as by enhancing the pipe strength. Thermoplastic fibers are preferred in accordance with methods and structures of the present invention to facilitate the use of joining techniques and hot-tapping techniques common in the natural gas distribution industry. Non-woven, heat shrinkable fibers are also employed in sleeve structures to produce a protective fibrous jacket or layer.

9 Claims, 1 Drawing Sheet

PIPE DESIGNS USING COMPOSITE MATERIALS

This application is a continuation of application Ser. No. 08/297,366, filed Aug. 29, 1994 now abandoned.

CROSS-REFERENCE TO RELATED INVENTION

This invention is related to the subject matter disclosed in U.S. patent application Ser. No. 08/297,325, filed Aug. 29, 1994 (concurrently herewith), entitled "Thermoplastic Composite Materials for Pipe Construction", now abandoned, the disclosure of which is incorporated herein by reference.

BACKGROUND

The present invention relates to composite pipes having fiber reinforcement and to methods for producing them. In particular, the invention relates to methods for using the heat of production and pressure to apply a fiber layer to the outer surface of a pipe before it cools, for generating heat by friction to apply a fiber layer to the outer surface of a pipe, and for using non-woven, heat shrinkable fiber reinforcement in composite pipe materials, and to the products made thereby.

The need exists to improve the damage tolerance of plastic pipes that are used to distribute natural gas. Although filament-wound thermoset pipes are employed in high pressure systems for transporting chemicals, natural gas distribution piping systems consist primarily of high density polyethylene that is not fiber reinforced. This weaker unreinforced system is used in natural gas distribution systems primarily because it is flexible and because joining by butt fusion and other techniques involving heat, and hot tapping methods, are entrenched activities in the natural gas distribution industry. Fiber reinforced pipes would be desirable for increased strength and wear resistance, but such reinforcement has been avoided in the natural gas distribution industry because it impedes necessary joining and hot tapping procedures common in the industry. Current methods of fiber reinforcement allow only the use of mechanical joining methods. Accordingly, it remains a problem in the natural gas distribution industry that surface scratches in unreinforced polyethylene pipe surfaces can encourage polyethylene cracks in natural gas distribution piping.

Adding strength to piping, various methods of producing pipes having fibrous surface layers, or intermediate fiber layers applied to a core, are known, and vary greatly. For example, heat and pressure have been used to bond fibers to an inner pipe or core, as shown by Landry et al., U.S. Pat. No. 4,915,139, issued Apr. 10, 1990, and Ball, U.S. Pat. No. 3,913,624, issued Oct. 21, 1975. In those references heat is applied to the core after assembly of various elements and fibers therearound. In another example, Greco, U.S. Pat. No. 4,308,895, issued Jan. 5, 1982, heat is used to bond a reinforcing strand to an outer jacket. Other references adhere or embed reinforcing fibers in the inner pipe using adhesives (Chrow, U.S. Pat. No. 3,805,848, issued Apr. 23, 1974; Matthews, U.S. Pat. No. 3,772,550, issued Mar. 27, 1973; and Shrock, U.S. Pat. No. 3,720,235, issued Mar. 13, 1973) or plasticizers (Chudgar, U.S. Pat. No. 3,866,631, issued Feb. 18, 1975). Mixing of fibers with an extrudate layer is shown by Shirasaki et al, U.S. Pat. No. 4,840,826, issued Jun. 20, 1989, and Stent, U.S. Pat. No. 3,825,036, issued Jul. 23, 1974.

Among other materials, heat shrinkable plastics, also referred to as heat recoverable materials, have been variously used in pipe production, as shown by Landry et al.; Pithouse et al., U.S. Pat. No. 4,631,098, issued Dec. 23, 1986; and patents to Cook, U.S. Pat. No. 3,253,618, issued May 31, 1966, and U.S. Pat. No. 3,253,619, issued May 31, 1966. Landry et al., focuses upon the problems of sealing heat shrink material to an article, and making heat shrink material more cut resistant. To this end, Landry et al. introduces an inner melt layer to improve sealing, and a layer of conventional fiber reinforcement to the heat shrinkable tube material. Pithouse et al. disclose a two layer material in which a woven mat of fibers shrink in a softened polymer layer. The '618 and '619 patents to Cook also teach the use of woven or braided conventional fiber materials used as reinforcement for heat shrinkable tubes. The '618 patent refers to use of such woven fiber-reinforced heat shrinkable tubes at splice closures,and the '619 patent goes further to specifically note the use of heat shrinkable materials in the construction of reinforced conduits for carrying gases. Pithouse et al. specifically note the use of heat recoverable materials to enclose a substrate such as a cable.

However, the need remains for still further methods of reinforced pipe production which provide opportunities for lower cost production, high strength, and additional properties in natural gas distribution pipeline applications, such as providing reinforced pipe having the capability for joining by techniques such as butt fusion and hot tapping techniques desired for natural gas distribution applications. Pipes with improved damage tolerance are needed to ensure the durability of these pipes throughout their scheduled service life.

SUMMARY

The present invention satisfies that need by providing methods and improved pipe structures for natural gas distribution pipelines. The methods of the present invention produce a thin fibrous jacket or layer which can inhibit and prevent polyethylene cracks in natural gas distribution piping by preventing surface scratches as well as by enhancing the pipe strength. Thermoplastic fibers are preferred to facilitate the use of joining techniques and hot-tapping techniques common in the natural gas distribution industry.

In accordance with the present invention, methods are provided for producing fiber reinforced plastic pipe for the natural gas distribution industry. These methods incorporate fiber reinforcement in the pipe structure by using or generating heat and/or pressure to bond the fibers. Thermoplastic fibers are preferred to permit the use of desired joining and hot-tapping techniques on the pipe.

A first method according to the present invention calls for applying fibers to the pipe while the pipe remains heated from the heat of production so that the fibers bond thereto. The fibers can be applied by helically winding long strands (roving) on the outer layer of the pipe to form a non-woven layer and produce a continuous fibrous composite, or by randomly depositing chopped fibers on the surface of the pipe during molding or extrusion. The pipe is preferably of polyethylene and the fibers are preferably of nylon, polyester or polyolefin. Other fibers that are usable with this invention include polybenzimidazoles and engineering liquid crystal fibers such as Kevlar®.

A second method according to the invention calls for embedding fibers in the outer surface of the pipe by generating frictional heat at the pipe surface. In accordance with the second method, a roving having high strength and high melting point compared to the polymer of the pipe is embedded by a friction welding process, e.g. where the roving is pulled back and forth to create frictional heat, raising the local temperature of the pipe surface to the melting point of the pipe material, so that the fiber becomes embedded. This second method may further be practiced in combination with the first method, to enhance the heat of production.

A third method employing non-woven, typically heat shrinkable, fibers in a sleeve is provided to produce a shrink fitted layer on the outer surface of a polymer pipe. Typically heat is present as heat of production of the pipe, heat from joining at a pipe joint, or heat separately applied. A pipe structure is produced having a layer or sleeve made of polymeric fibers shrink-fitted onto the outer pipe surface where it adheres tightly to protect and strengthen the pipe. The sleeve can be detached mechanically during joining or hot tapping or, if made of an appropriate material, melted during those procedures. The sleeve fibers are preferably polymeric, e.g. nylon or polyethylene, as well as blends of non-woven fibers, particularly fibers such as meltblown polyolefin. Ceramic or metal fibers may also be added to increase the strength, with metal fibers further aiding in pipe location detection. Optical fibers may be used to further provide a monitoring function, particularly when the entire pipe is wrapped with the sleeve material.

Pipe strength and damage tolerance are enhanced at the pipe/soil interface where scratches and cuts can otherwise occur in the pipe. A thin outer layer of bonded fibers will not interfere with butt fusion by hot plate welding methods, and can be removed by melting or pyrolysis for hot tapping. The use of sleeves further provides added protection at joints.

It is an object of this invention to make possible the production and use of fiber-reinforced plastic pipe that meets the needs of the natural gas distribution industry.

A further object is to produce a pipe for natural gas distribution wherein the strength and damage tolerance is enhanced by the incorporation of fibers, while the cost is kept low by use of fibers primarily at the outer surface.

It is a still further object of the invention to provide a method for producing fiber reinforced pipe using the heat of production.

Another object is to provide a method for producing fiber reinforced pipe by friction heating the surface of a pipe with the fibrous material to be embedded therein.

It is yet another object to provide a fiber reinforced pipe having a shrink fitted outer layer of randomly ordered fibers of heat shrinkable fibers.

These and other objects, features, and advantages of the present invention will be apparent from the drawings, detailed description, and claims which follow.

DRAWINGS

PREFERRED EMBODIMENTS

The methods of the present invention produce a thin fibrous jacket or layer in the outer surface of a plastic pipe that can inhibit and prevent cracks in natural gas distribution piping by preventing surface scratches as well as by enhancing the pipe strength. Use of the term fibers herein generically includes, for example, ribbons, strands, and filaments. Thermoplastic fibers are preferred to facilitate the use of joining techniques and hot-tapping techniques common in the natural gas distribution industry. Preferably, such thermoplastic fibers have melting points at least about 10° degrees Celsius (typically about 10° to 250°, and preferably about 20° to 100 ) above the melting point of the polymer pipe.

Figure 1:
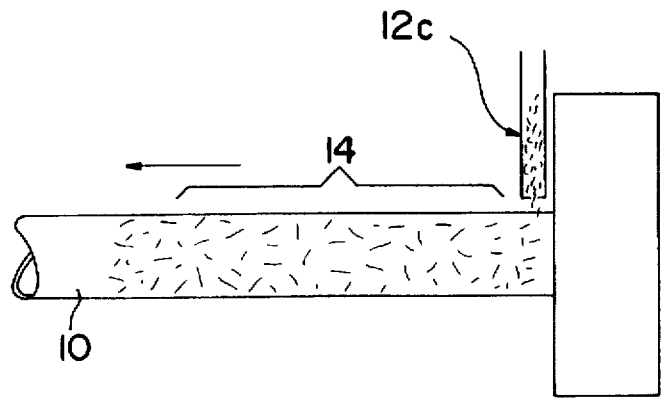
FIG. 1 is a schematic side view of a pipe having a plurality of fibers randomly applied to the outer circumferential surface thereof in accordance with the first method of the present invention.

Referring now to FIG. 1, in accordance with the first method of the present invention, a pipe 10 is first formed from heated thermoplastic polymeric material, and fibers 12 are then applied to at least a portion of the outer surface of the pipe 10 while it remains heated from the heat of production so that the fibers 12 in contact therewith will adhere or bond thereto. The fibers 12 can be applied by helically winding, as known in the art, long strands (roving) on the outer layer of the pipe 10 to form a non-woven layer and produce a continuous fibrous composite, or by randomly depositing chopped fibers 12c on the surface of the pipe 10 during molding or extrusion, as illustratively shown in FIG. 1. The fibers 12 that are applied produce at least a portion of a non-woven outer layer 14 on the outer surface of the pipe 10. The pipe typically comprises a thermoplastic polymeric material, preferably polyethylene and more preferably high-density polyethylene. The fibers preferably comprise nylon, polyester, or polyolefin, and may comprise non-woven, typically heat shrinkable, material, metal, ceramic, or combinations of fiber materials.

Forming of the pipe 10 may be by methods known in the art, such as extrusion (representatively shown in FIG. 1), pultrusion, and molding, so long as the pipe thus formed retains heat sufficient for fibers 12 in contact therewith to adhere thereto.

The step of applying fibers 12 may also further include applying bonding pressure to said fibers in contact with said outer surface. Where chopped fibers are randomly applied, pressure may be applied directly to the fibers and the outer surface of the pipe by, for example, rollers. Where long strands are applied, the bonding pressure may be applied by tensioning the strands, or by the application of pressure directly to the fibers. Further, the steps of applying fibers and producing at least a portion of a non-woven outer layer of thermoplastic fibers may be performed during the step of forming, so that the fibers are applied immediately as the pipe is formed, as illustrated in FIG. 1.

Figure 2:
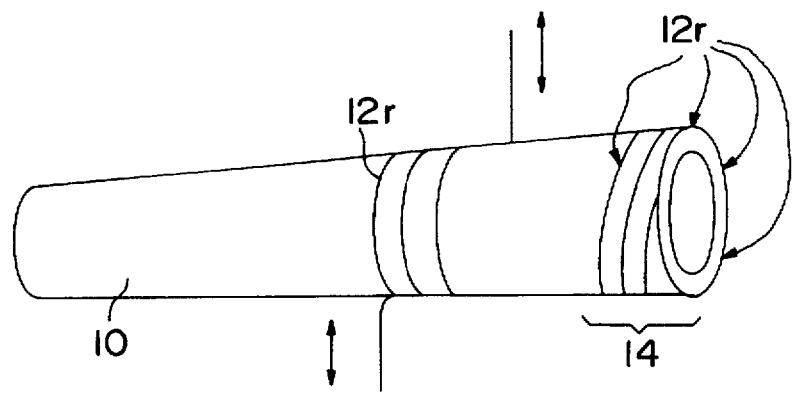
FIG. 2 is a schematic side view of a pipe showing roving applied to the outer surface thereof in accordance with the second method of the present invention.

The second method of the present invention, as shown in FIG. 2, calls for embedding fibers 12 in the outer surface of the pipe 10 by a friction welding process, using a roving 12r having higher strength and higher melting point than the polymer of the pipe 10. In accordance with the second method, a high strength roving 12r is wrapped at least once around a polymer pipe 10, and the roving 12r is repeatedly moved across the surface of the pipe 10 to create frictional heat, locally heating the pipe surface to approximately the melting point of its polymeric material. At least a portion of the roving 12r is then embedded in the heated surface of the pipe, thereby producing a thin layer 14 of reinforcement in at least a portion of the outer surface of the polymer pipe, as shown in FIG. 2.

The method may be performed by wrapping a substantial portion of the pipe surface with roving, such that the roving is ultimately embedded in a substantial portion of said pipe surface and produces thereby an outer layer of fiber reinforcement for substantially the entire pipe.

Repeated movement of the roving across the surface of the pipe may be performed by reciprocating the roving generally along the same path in any convenient direction in contact with said pipe surface, or by varying the path to generally heat the entire pipe surface. The temperature to which the pipe surface is heated may vary depending on the melting temperature of the polymer pipe. Alternatively, the roving may be wrapped around the pipe and the pipe spun therein to generate heat by friction. The pipe may be secured in this alternative by inserting chucks into its end or spindles therethrough. Regardless, the second method may also be performed in combination with the first method to enhance, by frictional heating, the outer surface temperature of a heated polymer pipe being reinforced.

In accordance with these methods of the present invention, heat shrinkable fibers may be used which will serve to enhance the adherence of fibers to the heated pipe, particularly where fibers are wrapped around the pipe. The shrinkable nature of the fibers enhances, by shrinkage, the bonding pressure applied to the pipe's outer surface, thereby improving adherence and bonding.

Figure 3:
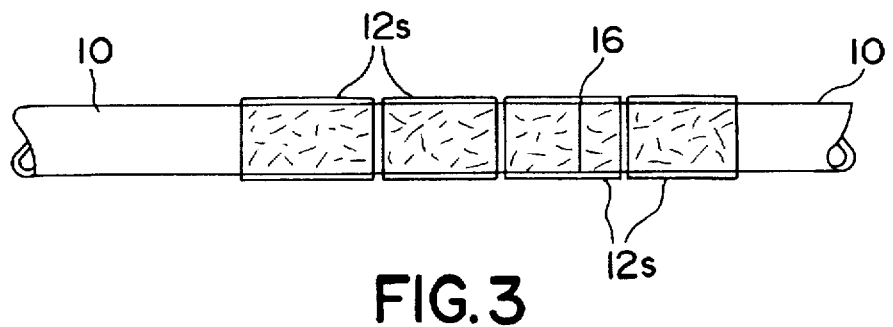
FIG. 3 is a schematic side view of a pipe structure in accordance with the present invention including a plurality of sleeves of heat shrink fibers in accordance with the present invention.

Referring now to FIG. 3, a third method employing non-woven heat shrinkable fibers in a sleeve is provided to produce a shrink fitted layer on the outer surface of a polymer pipe. In accordance with the third method, heat is present as heat of production of the pipe, heat from joining at a pipe joint, or separately applied to the sleeve. In accordance with this further aspect of the invention, a thin outer layer of non-woven fiber reinforcement may be applied as a heat shrinkable material sleeve 12s to a polymer pipe 10 to produce a fiber reinforced polymer pipe. In this structure, the heat shrinkable material sleeve 12s is shrink fitted over the outer surface of the pipe 10 to cover at least a portion of the pipe, or a pipe joint 16. The sleeve 12s preferably comprises a plurality of non-woven heat shrinkable randomly ordered polymer fibers which, while not woven, are sufficiently randomly interrelated as a random matrix to form a mat of material. Additional mechanical interrelationships can be introduced into the random matrix, such as by needle punching, or occasional fiber bonding by heat or adhesive means. The sleeve may be applied over a substantial portion of a pipe or to a segment thereof, as shown in FIG. 3. Depending on the degree of bonding to the outer surface of the pipe 10, the sleeves 12s may be removed for hot tapping, or where preferred thermoplastics are used, melted to provide needed access.

Alternatively, the randomly ordered fibers are disposed randomly, or as a mat of material, in a continuous, non-fibrous matrix comprising a heat shrinkable second polymer (not shown).

The plurality of randomly ordered heat shrinkable fibers preferably comprise nylon, polyester, and polyolefin, or combinations thereof. The sleeve of randomly ordered heat shrinkable fibers may further include more ordinary fibers, such as fibers of metal, ceramic, glass, and carbon, as well as those having fiber-optic properties, which enable the sleeve to provide additional features, such as locatability (metal fibers) where used at a joint, or for general pipe locatability, added strength (metal, ceramic, glass, or carbon), monitoring or sensing capability (metal, ceramic, or fiber-optic materials of continuous substantial length) when coupled with known sensing equipment, such as current sources, temperature sensing devices, or optical fiber viewing equipment.

Generally, the thin outer layer provided in accordance with the present invention enhances pipe strength and scratch resistance without introducing fiber bonding problems or increased porosity which accompany mixing of fibers with material used to form the pipe. Also a broader range of material may be usefully applied to pipe segments as needed.

Samples of five composite pipe designs were prepared by applying overwraps to 2-inch diameter high density polyethylene (HDPE) pipe (see Table). Spectra®, which is manufactured by Allied Signal, is an ultrahigh molecular weight, ultradrawn, highly oriented, polyethylene fiber that can be used in protection of personnel from bullets. Compet®, which is manufactured by Hoechst-Celanese, is an oriented, fibrous, polyethylene terephthalate. Nylon cloth is made from polyamide fiber. Medium density polyethylene (MDPE) is used to impregnate the overwraps and thus to improve adhesion between the fibrous overwrap and the pipe. An untreated HDPE pipe and a pipe overwrapped with the MDPE impregnant in film form were used as controls.

Wall thickness retention was measured at numerous locations on the samples and averaged to provide one view of damage tolerance. Damage tolerance tests also were conducted, using an impact tester that was equipped with a Rheometrics instrument to measure energy absorption. Results of the tests are given in the table. All of the samples that have fibrous overwraps showed greatly enhanced damage tolerance. Both the control with no overwrap and the control with a non-fibrous overwrap performed less well. These tests thus establish the merits of fibrous overwraps to improve the damage tolerance of plastic piping for gas distribution applications.

TABLE

DATA ON DAMAGE TOLERANCE OF HDPE PIPE SAMPLES

| Number of Plies | Overwrap Material Impregnated with MDPE | Percent Wall Thickness Retained | Total Energy Absorbed (ft-lbs) |
|---|---|---|---|
| 2 | Spectra ®[(a)] | 96 | 951 |
| 1 | Spectra ® | 94 | 907 |
| 2 | Compet ®[(b)]/Spectra ® | 93 | 906 |
| 1 | Nylon Cloth | 92 | 929 |
| 1 | Compet ®/Spectra ® | 91 | 908 |
| 1 | MDPE Film | 86 | 813 |
| 0 | None (Control) | 79 | 787 |

[(a)]Spectra ® is made by Allied Signal.
[(b)]Compet ® is made by Hoechst-Celanese.

While certain representative embodiments and details have been for purposes of illustrating the invention, it will be ent that various changes in the methods and articles disclosed n may be made without departing from the scope of the tion, which is defined in the claims.

What is claimed is:

1. A fiber reinforced polymer pipe for natural gas distribution comprising:

a pipe fabricated from a polymeric material and having an outer surface;

a heat shrunk sleeve covering at least a portion of the outer surface of said pipe, wherein said heat shrunk sleeve is at least partially removable from the outer surface so as to facilitate thermal joinder of one polymeric pipe to another polymeric pipe; and said heat shrunk sleeve covering at least a portion of the outer surface of the pipe and said polymeric pipe are both collectively flexible.

2. The pipe of claim 1 wherein said heat shrunk sleeve comprises a random matrix of fibers forming a non-woven mat of material.

3. The pipe of claim 1 wherein said heat shrunk sleeve includes fibers that are disposed in a continuous, non-fibrous matrix comprising a heat shrunk second polymer.

4. The pipe of claim 1 wherein said heat shrunk sleeve includes fibers comprising at least one material from the group consisting of nylon, polyester, and polyolefin.

5. The pipe of claim 1 wherein said heat shrunk sleeve further includes a plurality of randomly ordered fibers, including at least one material from the group consisting of metal, ceramic, glass, and carbon.

6. The pipe of claim 1 wherein said heat shrunk sleeve includes at least one fiber comprising a fiber-optic material of continuous substantial length.

7. The pipe of claim 1 wherein:
   said heat shrunk sleeve includes fibers comprising a random matrix forming a mat of non-woven material, and
   said heat shrunk sleeve includes fibers disposed in a continuous, non-fibrous matrix comprising a heat-shrunk second polymer.

8. The pipe of claim 7 wherein said heat shrunk sleeve further includes a plurality of randomly ordered fibers including at least one material from the group consisting of metal, ceramic, glass, and carbon.

9. The pipe of claim 1 wherein said heat shrunk sleeve includes fibers having a higher melting point than said first polymeric material of said pipe, and the difference in melting points is approximately 10° to 250°, and preferably about 20° to 100°, degrees Celsius.

* * * * *